US007012895B1

(12) United States Patent
Mir

(10) Patent No.: US 7,012,895 B1
(45) Date of Patent: Mar. 14, 2006

(54) PACKET-SWITCHING NETWORK WITH SYMMETRICAL TOPOLOGY AND METHOD OF ROUTING PACKETS

(75) Inventor: Nader F. Mir, Lexington, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 734 days.

(21) Appl. No.: 09/715,693

(22) Filed: Nov. 17, 2000

(51) Int. Cl.
 *H04L 12/28* (2006.01)
(52) U.S. Cl. .................. 370/235; 370/392; 370/395.1; 370/400; 370/419; 370/427; 370/474
(58) Field of Classification Search ................ 370/230, 370/235, 351, 389, 392, 395.1, 396–398, 370/400, 409, 419, 427, 465, 479, 360, 474
See application file for complete search history.

(56) References Cited

U.S. PATENT DOCUMENTS

| 5,022,025 A | 6/1991 | Urushidani ................. 370/60 |
| 5,023,864 A | 6/1991 | Cloonan et al. ............... 370/1 |
| 5,077,483 A | 12/1991 | Cloonan et al. ............ 359/135 |
| 5,124,978 A | 6/1992 | Chao ........................... 370/60 |
| 5,126,999 A | 6/1992 | Munter et al. ................ 370/60 |
| 5,132,965 A | 7/1992 | Zhang .......................... 370/60 |
| 5,144,619 A | 9/1992 | Munter ...................... 370/60.1 |
| 5,168,492 A | 12/1992 | Beshai et al. .............. 370/60.1 |
| 5,179,552 A | 1/1993 | Chao ........................... 370/60 |
| 5,179,558 A | 1/1993 | Thacker et al. ............ 370/94.3 |
| 5,191,578 A | 3/1993 | Lee .............................. 370/63 |
| 5,199,028 A | 3/1993 | Arnold ........................ 370/60 |
| 5,253,251 A | 10/1993 | Aramaki ..................... 370/60 |
| 5,257,266 A | 10/1993 | Maki .......................... 371/8.2 |
| 5,319,639 A | 6/1994 | Guha .......................... 370/60 |
| 5,377,182 A | 12/1994 | Monacos .................... 370/16 |
| 5,602,838 A | 2/1997 | Kartalopoulos ............ 370/406 |
| 5,613,069 A | 3/1997 | Walker ................... 395/200.15 |
| 5,617,413 A | 4/1997 | Monacos ..................... 370/400 |
| 5,631,902 A | 5/1997 | Yoshifuji ..................... 370/388 |

(Continued)

OTHER PUBLICATIONS

Reprinted from Computer Desktop Encyclopedia Computer Desktop Encyclopedia, TCP/IP abc's, pp. 1-8, (1981-1999).

(Continued)

*Primary Examiner*—Steven Nguyen
*Assistant Examiner*—Roberta Shand
(74) *Attorney, Agent, or Firm*—Macheledt Bales & Heidmiller LLP

(57) ABSTRACT

A mesh network for routing a plurality of data segments therethrough, each of the data segments containing address information. The network includes: a first, second, and third switch element each having a respective external input for routing data segments into the network and a respective external output for routing data segments out of the network; a bi-directional coupling between each of the switch elements; and a first controller for interrogating the address information of each of the data segments inbound into the first switch element. The exit pathway for any inbound data segment received by a switch element is selected according to the address information of that data segment, and if a contention exists for the exit pathway, further according to a priority designator of that data segment. The first external output, if free and if the first switch element is the outbound destination for that data segment, will be selected as the exit pathway, otherwise one of said bi-directional couplings in communication with the first switch element will be selected as the exit pathway. Also, an associated method and computer executable program code on a computer readable storage medium for routing a plurality of data segments through a mesh network.

18 Claims, 5 Drawing Sheets

U.S. PATENT DOCUMENTS

| | | | |
|---|---|---|---|
| 5,798,580 A | 8/1998 | Morozov et al. | 307/112 |
| 5,856,977 A | 1/1999 | Yang et al. | 370/411 |
| 5,859,835 A | 1/1999 | Varma et al. | 370/229 |
| 5,892,766 A | 4/1999 | Wicki et al. | 370/412 |
| 5,923,656 A | 7/1999 | Duan et al. | 370/395 |
| 6,011,780 A * | 1/2000 | Vaman et al. | 370/237 |
| 6,069,720 A * | 5/2000 | Cotter et al. | 398/1 |
| 6,141,344 A * | 10/2000 | DeLong | 370/360 |
| 6,219,161 B1 * | 4/2001 | Chang et al. | 398/79 |
| 6,449,283 B1 * | 9/2002 | Chao et al. | 370/461 |
| 6,532,088 B1 * | 3/2003 | Dantu et al. | 398/43 |
| 6,556,541 B1 * | 4/2003 | Bare | 370/235 |
| 6,643,041 B1 * | 11/2003 | Ikeda et al. | 398/79 |

OTHER PUBLICATIONS

Reprinted from vol. 6 No. 9, *IEEE Journal on Selected Areas in Communcications*, pp. 1521-1527 (Dec. 1988) Uematsu, Hitoshi, et al., pp. 226-232.

Maxemchuk, Nicholas F., vol. Com-35 No. 5, *IEEE Transactions on Communications*, pp. 503-512 (May 1987).

http://networks.ecse.rpi.edu/~vastola/pslinks/perf/node27.html http://networks.ecse.rpi.edu/~vastola/pslinks/perf/node28.html http://networks.ecse.rpi.edu/~vastola/pslinks/perf/node30.html Vastola, Ken, "Inside a Router in a Packet Switching Network", "Single Queus Model of a Transmission Link in a Packet Switched Network", "The Poisson Arrival Model" (Aug. 3, 1999).

For Background Reference Only http://backofficesystems.com/tips/ip/tcpip.htm "Transmission Control Protocol/Internet Protocol", (Sep. 20, 2000).

Young, Paul H., 3$^{rd}$ Edition, *Electronic Communication Techniques*, Macmillan Publishing Co., Englewood Cliffs, New Jersey, pp. 562-567 (1990).

Reprinted from Computer Desktop Encyclopedia Computer Desktop Encyclopedia, ATM, pp. 1-3, (1981-1999).

http://www.sanders.com/hpc/ArchGuide/Generic/SW.html "Switch Architecture", (Aug. 4, 1999).

* cited by examiner

PACKET-SWITCHING NETWORK WITH SYMMETRICAL TOPOLOGY AND METHOD OF ROUTING PACKETS

BACKGROUND OF THE INVENTION

In general, the present invention relates to communications networks that utilize packet switching as the data transmission technique whereby the messages are split into small bundles of data (depending upon the data link layer or protocol, commonly referred to as cells, datagrams, data units, frames, packets, or simply, data segments) and routed through the network with each packet containing coded information concerning its source and destination. More particularly, the invention relates to a unique network and method for routing data segments, each of which contains address information, having at least a first, second, and third switch element bi-directionally intra-coupled. Locating bi-directional couplings between neighboring switch elements along a generally shortest available path between the coupled switch elements creates a spherical network topology—the couplings appearing like spokes of a tire. Each switch element (a) has an external input for routing data segments into the network, and (b) is in communication with a respective first, second, and third controller for interrogating the address information of each data segment inbound into the switch element. Each inbound data segment received by any of the switch elements is directed out along a selected exit pathway. This exit pathway is selected according to the address information of the particular inbound data segment received, and if a contention exists for the exit pathway, further according to a priority designator of that data segment. Based upon the address information and contention resolution, the selected exit pathway will be one of the bi-directional couplings, or if the respective switch element is the outbound destination for that data segment, an external output of that switch element.

A packet (synonymously used herein with data segment or cell) is any 'block' or bundle of information that has been split apart from a larger data bundle for transmission over a network. Packet-switching is the process by which messages are split into these data chunks (packets) and the packets co-mingled and sorted over common transmission lines. The packets representing a single message will likely not travel the same path. Each packet contains an address of origin, the address of its destination, and information about how to reunite with other related packets. The dynamic routing of messages in the form of packets (data segments) over different pathways through a complex telecommunications network (around nodes that are congested or have failed), and reconstruction into a proper sequence at a destination, allows for more-efficient transmission of electrical and optical signals, especially during peak usage. There are many technologies and protocols currently in place to support the transmission of packets (data segments), analog and digital, over electrical and fiber optic lines, including: ATM (Asynchronous Transfer Mode—a multiplexing technique that uses constant-length packets with 48 bytes of message data and 5 bytes of control data), TCP/IP (Transmission Control Protocol/Internet Protocol—a five layer model), UDP (User Datagram Protocol—an alternative to TCP), OSI (Open System Interconnection-a seven layer model), NetWare, IPX/SPX, NetBIOS, AppleTalk, and DECnet. Further, packetized data representing realtime voice and video, as well as text, can be transmitted over a packet-switching telecommunications networks as well as cellular networks.

CONVENTIONAL PACKET-SWITCHING

There are many challenges to developing switching architectures that can support the complex, multifaceted communications networks in place to accommodate the ever-increasing demand on local, national, and global telecommunications systems. For example, having the capacity to multicast messages (whereby a message or series of messages is transmitted all at once to an identified list of recipients) is a highly desirable feature of data communication networks. Switching systems such as ATM must have a multicast capability as well as the capability to route many messages to one user. Traditional switching networks are subject to severe blocking when undergoing multicast, and here is where network architecture design and performance (traffic speed and transfer efficiency) play an important role.

Switching networks can be grouped into two major classifications: multistage inter-connection networks and deflection-routing networks. The multistage interconnection networks characteristically have a fixed number of stages through which packets pass. Conventional multistage interconnection networks include the banyan network and the Beneš network. The banyan switching network consists of switch cells with 2-input×2-output ports and buffer memories which prevent collisions of packets—it is a single-path switching network with only a one-route connection between any chosen input and output port. In deflection-routing networks, if two packets arrive at a particular switch device at a time, t, and both incoming packets require use of a given output from that particular device to reach a destination, a contention arises causing one packet to be deflected along a different output link and the other packet to be forwarded along the link in contention. The Manhattan-street network (MSN), so named for its resemblance to the layout of the one-way streets in downtown-Manhattan, and the shuffle network both fall into the deflection-routing network classification. Unfortunately, these conventional network architectures lack sufficient available interconnections for efficient multicast operation and further have, due to an over-deflection of packets, noticeable performance degradation when traffic load is high.

Therefore, a new useful network is needed for routing data segments/packets to respective destinations, utilizing a unique priority deflection technique in combination with a unique switch element topology whereby neighboring switch elements are bi-directionally coupled along a generally shortest available path therebetween. Unlike conventional architectures in use, the innovative mesh network and associated method of the invention provide a more symmetrical topology for handling packet traffic over bi-directionally coupled switch elements within this 'spherical' network in a more-efficient manner. Without an efficient and cost-effective architecture solution at hand for routing data segments/packets of all types through the complex web of inter-linked communications networks, in existence, planned for development and yet to be implemented, it will be very difficult for the telecommunications industry to meet its ever-increasing demand, as anyone who has tried to communicate over a network (regardless of size or distance covered) where valuable data/information has been lost, slow in arriving, or slow to transmit will readily understand.

SUMMARY OF THE INVENTION

It is a primary object of this invention to provide a network and method for routing data segments/packets, each of which contains address information, having at least a first, second, and third switch element bi-directionally coupled. Data segments may enter the unique mesh network at any respective switch element and are directed out of the element along the bi-directional couplings between elements until they reach an outbound destination. Where a contention exists for an exit pathway out from any particular switch element, a priority designator of the respective data segment is consulted and the data segment with the most or highest priority (the 'winner') is directed out along that desired exit pathway. Deflection of any data segment along an exit pathway not in a most-direct route to its final destination, is handled within the network (between switch elements): Only those data segments that have reached an outbound destination switch element are directed out of the mesh network along a respective external output thereof (and if contention exists for any desired external output exit pathway, the priority designator of each contending data segment is consulted to identify a winner to direct along the desired external output).

The innovative network and method, as contemplated and described herein, can accommodate: many different types of segments/packets/cells/chunks of information transmitted over wide area networks (WAN), local area networks (LAN), cellular networks, and so on, as electrical or optical signals; a wide variety of types of network protocol; and many different types of computerized telecommunication devices/systems. Furthermore, in the spirit of the design goals contemplated hereby, the network, method, and associated program code of the invention may be tailored-to and practiced using available network hardware, software, and message transmission protocol; and much of the available communications network infrastructure currently in place is adaptable for incorporation with the invention as will be further appreciated.

Certain advantages of providing the flexible new network and method of routing data segments/packets to respective destinations, as described herein, follow:

(a) Cost Reduction—More efficient routing of a larger percentage of the data segments/packets/cells passing through complex networks over a wider transmission area reduces packet overhead (time it takes to transmit data on a packet-switched network), thus decreasing the overall costs of operating this spherical network, leading to potentially large cumulative cost savings in telecommunication. Further, an increased number of nodes per switch element provides for more deflection options for exit pathways in contention. Here, a greater percentage (or all) packets can remain in a state of transmission from element-to-element moving generally toward their respective outbound destination switch (to exit an available external output thereof), rather than being stored in-queue in large memory buffers over long periods of time. Fewer and smaller-sized buffers can be used at the external input of each switch element, and due to the number of pathway options between switch elements, effectively no buffers are needed along the bi-directional couplings therebetween—this particular process design simplification, alone, can have a huge cost savings impact on telecommunications.

(b) Design Flexibility and Versatility—The mesh network of the invention is adaptable for use in existing telecommunications infrastructure and can accommodate switch elements having different quantities of nodes based upon bi-directional coupling needs and the configuration and layout of neighboring switch elements. By providing signal transmission options and local input-port processing and output-port processing capability (for, among other things, conversion of packets into a recognizable format, the invention can be used in networks that handle electrical and/or optical signals.

(c) Decreased Packet Loss—A greater load capacity for handling traffic between switch elements within the mesh network frees up incoming link(s) into each switch element. This decreases the likelihood of having important incoming segment/packet information discarded at the front end due to full input-port buffers. Additionally, once an incoming data segment/packet has been received by a switch element from outside the network, it is not directed back out along an external output exit pathway unless that switch element is the packet's outbound destination.

Briefly described, once again, the invention includes a network for routing a plurality of data segments therethrough, each of the data segments contains address information. The network includes: a first, second, and third switch element each comprising a respective external input for routing data segments into the network and a respective external output for routing data segments out of the network; a bi-directional coupling between each of the switch elements; and a first controller for interrogating the address information of each of the data segments inbound into the first switch element, any of the inbound data segments received by this first switch element to be directed out along a selected exit pathway. The exit pathway for any inbound data segment so received is selected according to the address information of that data segment, and if a contention exists for the exit pathway, further according to a priority designator of that data segment. The first external output, if free and if the first switch element is the outbound destination for that data segment, will be selected as the exit pathway, otherwise one of said bi-directional couplings in communication with the first switch element will be selected as the exit pathway.

Additional further distinguishing features include the following: The first external input can be in direct communication with a first input-port processor which can, in turn, be connected to a buffer with buffer slots to accept incoming segments and hold them in-queue, if need be, until the first controller instructs the inbound data segment to enter the first switch element. Likewise the first external output can be in direct communication with a first output-port processor. Each bi-directional coupling can comprise fiber optic cabling for transmitting optical signals, or transmission media for carrying electrical signals; accordingly, the switch elements may be photonic wavelength converters or crossbar switches and the like, for handling data segment traffic within the elements and out along selected exit pathways. A fourth, fifth, sixth, and so on, switch element (each being associated with a respective location index and each comprising a respective external input for routing data segments into the network) can be added, as well as bi-directional couplings therebetween. The address information can include a source address and a destination address; the source address to be updated according to the respective location index of the receiving switch element. When a data segment's source address, as updated, is an equivalent of its destination address, this will indicate that the respective receiving switch element into which the data segment has entered, is the outbound destination of that data segment.

Also characterized herein is an associated method for routing a plurality of data segments through a network. The method comprises the steps of: providing bi-directional couplings between each of the switch elements; routing the data segments into any of the switch elements by way of a respective external input; interrogating an address information of each of the data segments inbound into any of the switch elements; and selecting an exit pathway for each inbound data segments received by a respective switch elements according to the address information of that data segment received, and if a contention exists for the exit pathway, further according to a priority designator of that data segment. Additional further distinguishing associated features will be appreciated as set forth herein, including: updating the priority designator of any data segment received for which the selected exit pathway is not along a generally direct route toward that data segment's outbound destination; and updating a source address of each inbound data segment received by a respective switch element according to a respective location index thereof—if the updated source address is an equivalent of the destination address of that data segment, it has arrived at its outbound destination, but if the updated source address is not yet such an equivalent, the data segment is directed out one of the bi-directional couplings along a generally direct route toward the data segment's outbound destination.

Further characterized is a computer executable program code on a computer readable storage medium. The program code has a first program sub-code for interrogating an address information of each of the data segments inbound into any of a first, second, and third switch element; whereby a bi-directional coupling is provided between each of the switch elements; and a second program sub-code for selecting an exit pathway for each inbound data segment received by a respective switch element according to the address information of that data segment, and if a contention exists for the exit pathway, further according to a priority designator of that data segment. Once again, the exit pathway will be an external output (if free and if that respective switch element is an outbound destination for that data segment), otherwise the exit pathway will be one of the bi-directional couplings.

BRIEF DESCRIPTION OF THE DRAWINGS

For purposes of illustrating the flexibility of design and versatility of the innovative preferred network, method, and associated program code, the invention will be more particularly described by referencing the accompanying drawings of embodiments of the invention (in which like numerals designate like parts). The figures have been included to communicate the features of the invention by way of example, only, and are in no way intended to unduly limit the disclosure hereof.

DETAILED DESCRIPTION OF THE PREFERRED EMBODIMENTS

Figure 1:
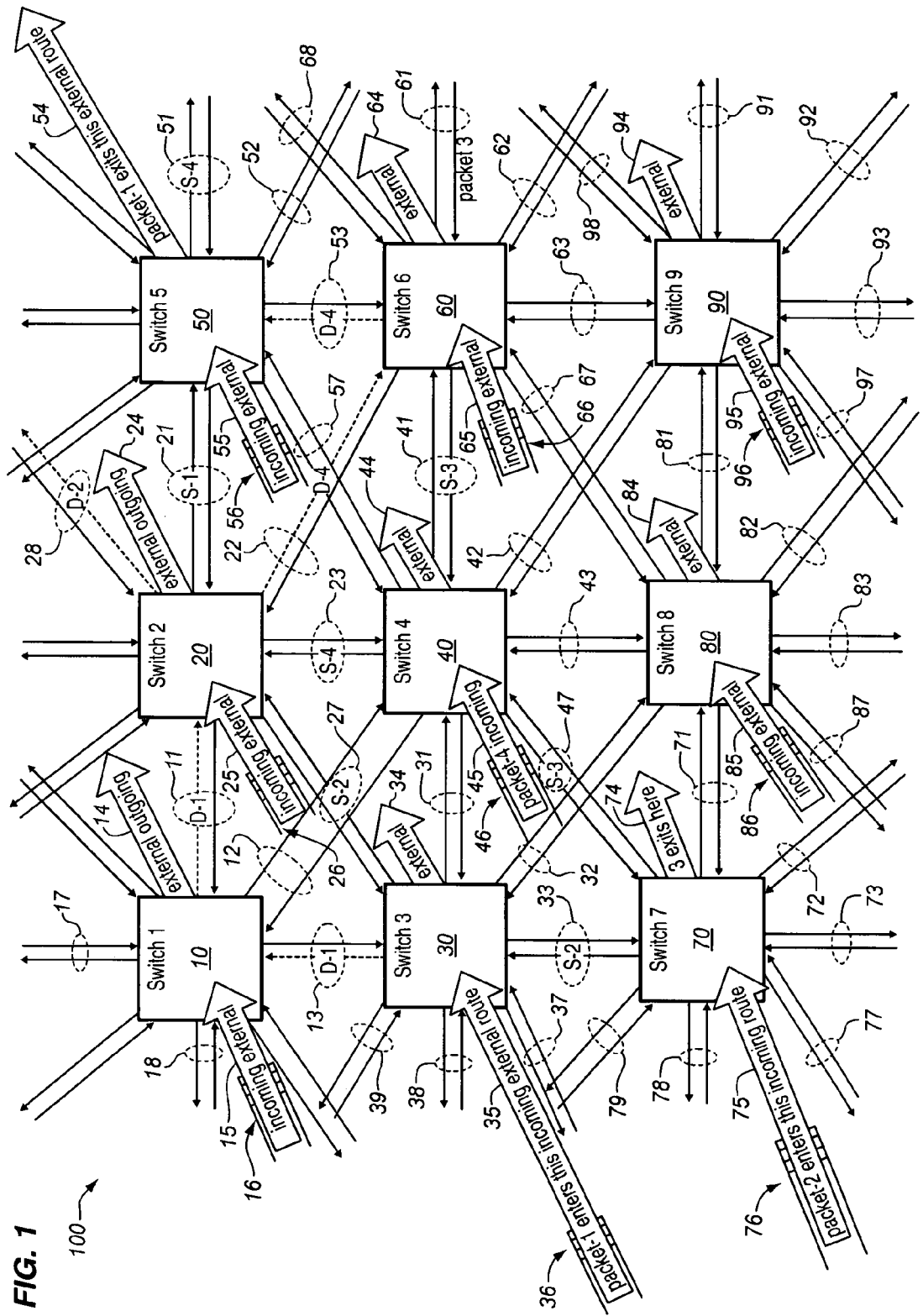
FIG. 1 is a schematic depicting data segment/packet flow through a preferred network of the invention; as represented, neighboring switch elements are bi-directionally coupled in a spoke-like fashion in the spherical mesh embodiment shown.

One can readily appreciate the symmetrical topology of network 100 in FIG. 1. This data flow schematic represents a preferred network 100, which by way of example includes nine switch elements 10, 20, 30, 40, 50, 60, 70, 80, 90, with each neighboring elements (10, 20, 30, and so on) bi-directionally coupled (at 11, 13, 27, and so on). Each element has a respective external input route (15, 25, 35, 45, 55, 65, 75, 85, 95) along which data segments/packets can enter the network at each switch element, and an external output route (14, 24, 34, 44, 54, 64, 74, 84, 94) along which each switch element can direct packets that have reached their outbound destination within the network, out of the network—to ultimately be reconstructed into the messages from which they were split for fast-track travel over the packet-switching transmission lines. Further, in the event needed (as will be discussed in connection with the more-detailed FIGS. 3A and 3B diagrams), each input route is shown in communication with a respective buffer (16, 26, 36, 46, 56, 66, 76, 86, 96) having buffer slots for holding incoming packets in-queue until instructed to enter the respective switch element.

Each bi-directional coupling between neighboring switch elements is represented by a pair of opposing arrows, each arrow representing the direction of data flow along one of the two links. For example, due to its central location within network 100, switch element 40 is bi-directional coupled with each of the nine elements shown: coupling 12 connects it with element 10; coupling 23 connects it with element 20; coupling 57 connects it with element 50; coupling 41 connects it with element 60; coupling 42 connects it with element 90; coupling 43 connects it with element 80; coupling 47 connects it with element 70; and coupling 31 connects it with element 30. As one can appreciate, in the event more switch elements (or fewer) are incorporated into the network, each is preferably interconnected with a neighboring element to provide a maximum number of intra-network deflection options. To illustrate this, peripheral switch elements (10, 20, 50, 60, 70, 80, 90) have bi-directional couplings with no switch element at the other end. Some of these have been labeled for reference: Element 10 has further couplings labeled 17, 18 for interconnecting respective neighboring elements not shown in FIG. 1; element 20 has further coupling 28; element 50 has a further coupling labeled 51, element 60 has further couplings labeled 61, 62, 68; and so on.

For purposes of explanation, the data flow of four identified data segments has been diagrammed in FIG. 1: Packet-1 is shown entering the network along route 35 and through the external input for switch element 30; packet-2 is shown entering the network along route 75 and through the external input for switch element 70; packet-3, already within the network from an unidentified source (not shown), is entering switch element 60 along bi-directional coupling 61; and packet-4 is shown entering along route and through the external input for switch element 40. More-particularly, packet-1 can be held in buffer 36 (along external incoming link 35) until instructions are provided allowing it to enter element 30 through the external input thereof. Note that packet-1 is destined for an outbound destination (switch element 50) where it is to be directed to leave along the external output for element 50, along route 54. A direct route option from element 30 to element 50 is along coupling 27. Presume packet-2 has entered switch 70 and arrives at element 30 at effectively the same time as packet-1 does, and a most-direct route out of element 30 is along coupling 27. Thus, two packets vying, at effectively the same time, for the same outgoing link of bi-directional coupling 27 causes a contention. This contention can be resolved, for example, as follows: Packet-2 'wins' and is allowed to exit element 30 along the outgoing link labeled S-2 of coupling 27; with packet-1 being deflected along an outgoing link (dashed arrow labeled D-1) of bi-directional coupling 13 and into switch element 10. Contention for a link of a bi-directional coupling or an external output route out of a switch element, exists whenever that link or route is a preferred/desired exit pathway for more than one data segment (whether the link/route is already busy when it becomes a preferred exit pathway for another packet, or whether that link/route simultaneously becomes a preferred exit pathway for more than one packet entering an element).

One can following the pathways taken by packet-3: It travels along coupling 61 into element 60, then along outgoing link S-3 of bi-directional coupling 41 into element 40, then along outgoing link S-3 of coupling 47 and into switch element 70, and finally out the external output along route 74 of element 70. Packet-4, having first traveled into and through a buffer 46, moves into element 40 along route 45, then along link S-4 of coupling 23 into element 20, then along dashed link D-4 of coupling 22 (due to losing the contention battle) into element 60, deflected back on-track to element 50 along dashed D-4 of coupling 53, and out of element 50 along link S-4 of coupling 51. As shown, buffers have effectively been eliminated between switch elements within the unique network 100.

Figure 2:
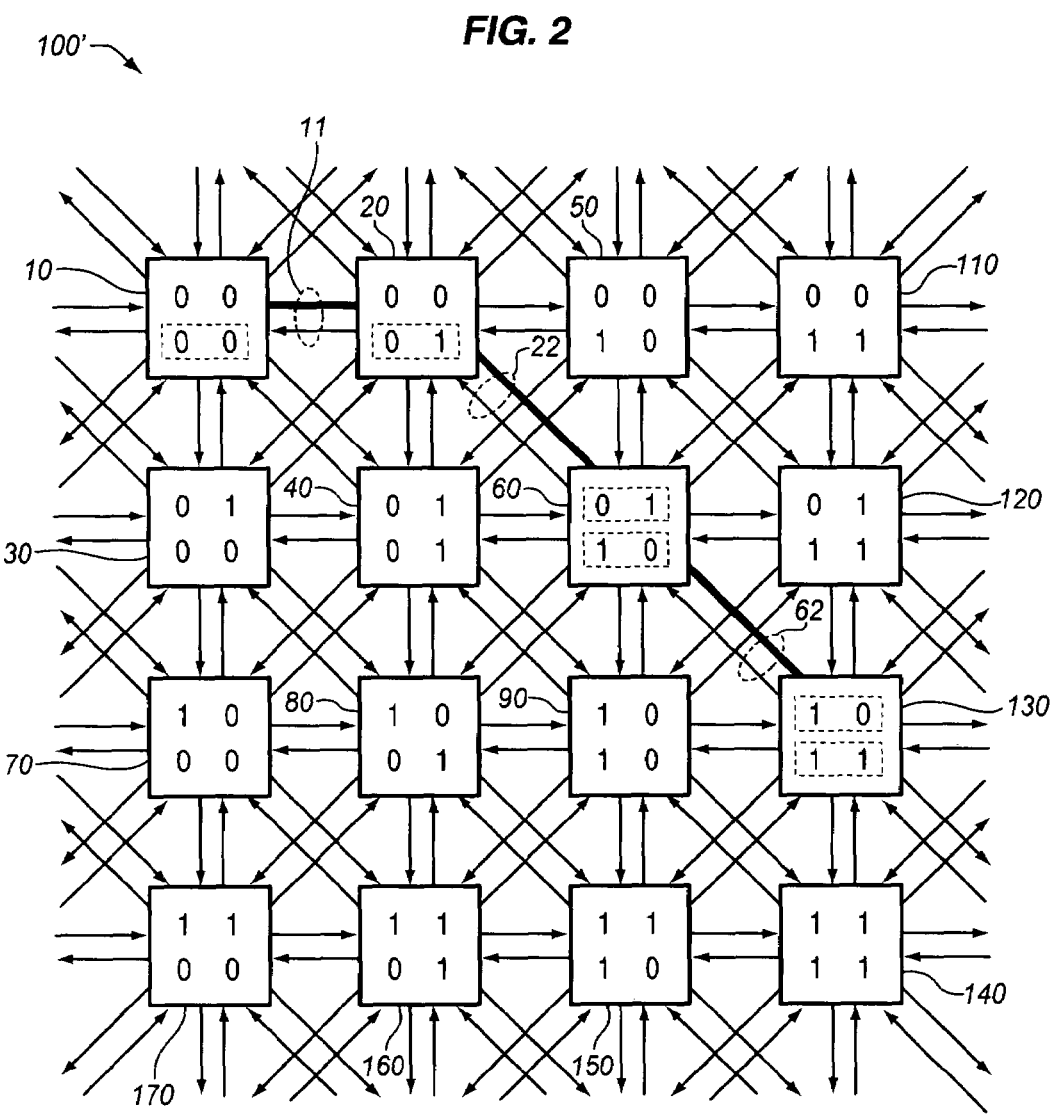
FIG. 2 is a schematic similar to that of FIG. 1 depicting data segment/packet flow through a network of the invention; each switch element has associated with it, a binary location index for reference.

In an effort to further illustrate the unique nature of the spherical network and associated method, FIG. 2 diagrammatically illustrates the use of location indices (here, in ascending order according to a binary matrix convention, element 10 is assigned 00—00 and element 140 is assigned 11—11) which can be used in connection with the routing or deflection of packets through network 100'. For example, a data segment traveling through the switch elements 10–170 as labeled in FIG. 2 may first go through element and element 60, along a preferred most-direct route from element 10 to an outbound destination element 130. A source address of this data segment, along the way, is updated accordingly to represent the location index of each switch element through which it passes: 00—00, 00-01, 01-10, 10-11 (this last index represents the data segment's outbound destination, i.e., the switch element through which the segment exits the network along a respective external output—not shown, for simplicity). The use of this convention allows for hop-by-hop incrementing of each packet's source address bits corresponding with the location index of every switch element visited based upon a preferred most-direct route to the outbound destination of that packet. The destination address, as part of every data segment/packet, is preferably initially indexed to (by way of a look-up table, for example) or set as, the location index of the segment's outbound destination. This way, the outbound destination of each data segment can readily be ascertained: Once an updated source address (by incrementing bits, or otherwise) becomes an equivalent of the destination address, the data segment has reached its outbound destination.

One can appreciate that, with eight bi-directional couplings between neighboring elements (see FIGS. 1 and 2) along with an external input and output route, each switch element represented preferably has nine input nodes and nine output nodes. A 9×9 crossbar switch offers such a configuration. Conventional crossbar switches generally (although not necessary) has the same number of inputs as outputs allowing signals entering any of the inputs to be connected with any of the outputs—this configuration provides the most flexibility especially when routing within a full n×n crossbar is controlled and instructions executed at sufficient speed. Neighboring switch elements are preferably bi-directionally coupled along a generally shortest available path therebetween, and although not shown in FIG. 2, each element has dedicated external input and output links. None of the conventional networks suggest such a topology. In the event the network and method of the invention are implemented utilizing any portion of the telecommunication infrastructure currently in place, lines/cabling installed to bi-directionally couple neighboring elements of a WAN or LAN will not be along a geometrically shortest distance therebetween, but rather along available transmission lines that follow geographical landmarks and structural features.

Figure 3A:
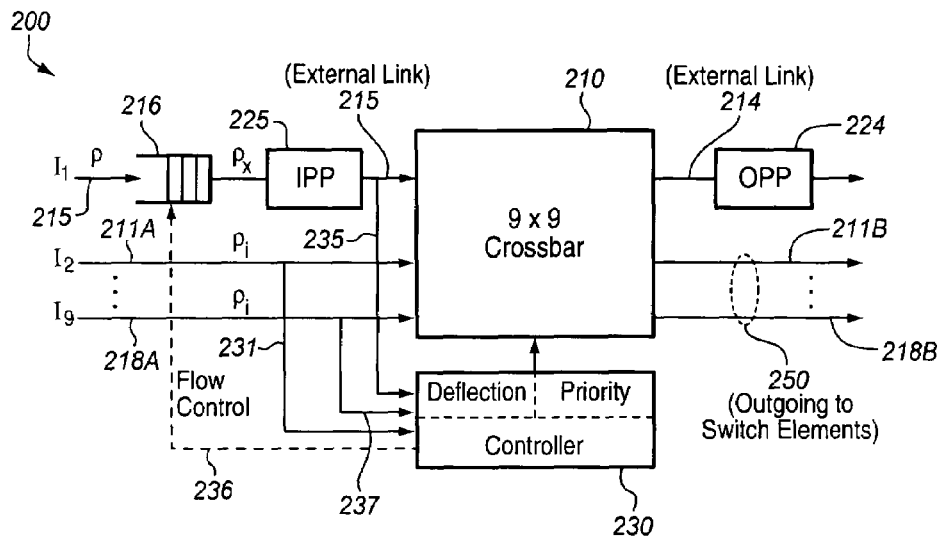
FIG. 3A is a schematic block-diagram depicting details of data segment/packet flow through a switch element identified here, by way of example only in light of the bi-directional coupling topology depicted in FIGS. 1 and 2, as a 9×9 crossbar switch.
Figure 3B:
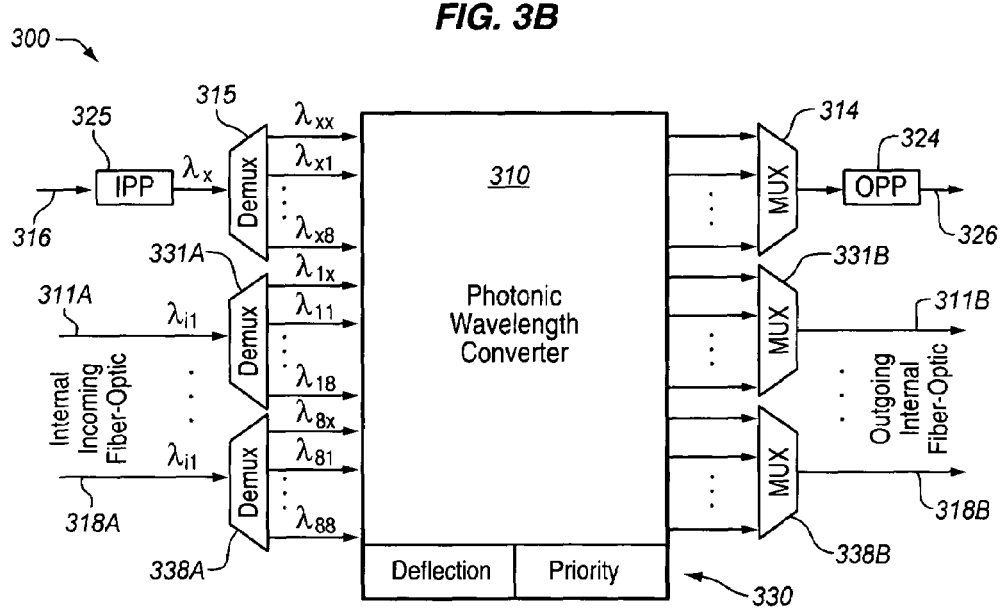
FIG. 3B is a schematic block-diagram depicting details of data segment/packet flow through an alternate switch element identified here, by way of example only as a photonic wavelength converter specifically for use in connection with packets transmitted in the form of optical signals.

The more-detailed FIGS. 3A and 3B further illustrate preferred alternative techniques by which data segments/packets flow into and through switch elements (for handling packets transmitted as electrical signals and as optical signals, respectively) according to the invention. Turning, first, to the preferred assembly 200 in FIG. 3A, packets entering (reference arrow $I_1$) the network along incoming route 215 are accepted into an input-port buffering structure 216 having buffer slots that can be used to store packets received thereby, if necessary, until permission is granted via controller 230 and instructions are sent 236 allowing the packet to enter the local input-port processor (IPP) 225. As also explained in connection with FIG. 7: Each packet for which such permission is granted is directed to a selected exit pathway out crossbar switch 210 by the IPP 225 according to information sent 235 to the controller 230 regarding the packet's destination address field and, if necessary to resolve a contention for a pathway initially identified based upon the most-direct route to the outbound destination, the packet's priority designator. The exit pathway out crossbar switch 210 could be any of the outgoing links 250 (such as outgoing links 211B through 218B which are part of bi-directional couplings represented as 211A–211B to 218A–218B), or if the packet has reached its outbound destination, the external output 214. Packets bound for other layers of the communications network protocol stack pass out along external output 214 and into output-port processor (OPP) in communication therewith. The OPP accepts packets from the network and resequences them in the event misordering occurs (due to delay, etc.) according to suitable conventional techniques.

In the event the bi-directional couplings include optical fiber links able to transmit optical signals compatible with, for example, wavelength division multiplexing (WDM) technology, the alternate preferred assembly 200 in FIG. 3B may be employed. WDM technology uses multiple lasers and transmits multiple light signals simultaneously over a single optical fiber. Each signal travels within its unique color band, which is modulated by the data (text, voice, video, etc.). A WDM signal is obtained by assigning a different frequency band (with its unique wavelength) to each tributary signal. This way, all signals can be transmitted over the same fiber with a higher bandwidth. The fiber bandwidth is divided into a number of non-overlapping optical wavelengths called WDM channels, each of which carries individual communication information. FIG. 3B depicts an optical signal with wavelength group, $\lambda_X$, entering the network along an external incoming route 316 and accepted into a local input-port processor (IPP) 325. Permission is granted by a local controller (represented by feature 330) and instructions are sent allowing the packet to enter the switch element 310 through an optical wavelength demultiplexor (DEMUX) 315 which readily converts the wavelength grouped transmission $\lambda_X$ (here, by way of example, containing nine intermixed optical signals) into its original separate signals of non-overlapping wavelengths appropriately represented by arrows $\lambda_{XX}, \lambda_{X1}, \lambda_{X2}, \ldots \lambda_{X8}$.

Likewise, incoming links (such as those labeled 311A through 318A of bi-directional couplings, respectively, 311A–311B to 318A–318B) capable of carrying optical signals from neighboring switch elements within the network (such as that at 100 in FIGS. 1 and 2) are each represented by a wavelength group $\lambda_{i1}, \lambda_{i2}, \lambda_{i3}, \ldots \lambda_{i8}$. As one can appreciate, by way of example the 9×9 photonic wavelength converter element 310 can accommodate eight bi-directional couplings plus the external input/output pair 316/326 (see, also, FIGS. 1 and 2). Prior to entering switch element 310, each of the eight wavelength groups $\lambda_{i1}, \lambda_{i2}, \lambda_{i3}, \ldots \lambda_{i8}$ pass through a respective optical wavelength demultiplexor (DEMUX) 331A through 338A which readily converts each incoming wavelength group transmitted into separate signals of non-overlapping wavelengths (here, each group contains nine intermixed optical signals) represented by arrow groupings: $\lambda_{i1}=\lambda_{1X}, \lambda_{11}, \lambda_{12} \ldots \lambda_{18}$ through $\lambda_{i8}=\lambda_{8X}, \lambda_{81}, \lambda_{82}, \ldots \lambda_{88}$.

Each of the wavelength groups that can be transmitted over any of the eight incoming fiber links (311A through 318A) or the external input route 316 are demultiplexed (331A–338A and 315) into their nine separate wavelengths containing respective source and destination information, prior to entering switch element 310. Each packet entering switch element 310 is directed to a selected exit pathway according to information embedded in the optical signal as interrogated by a local controller (at 330) regarding the packet's destination address and, if necessary to resolve a contention for a pathway initially identified based upon the most-direct route to the outbound destination, the packet's priority designator. The 9×9 photonic wavelength converter 310 has at least one node to correspond with external input route 316, one node to correspond with external output route 326, and at least two nodes to correspond with each bi-directional coupling (represented as pairs 311A–311B through 318A–318B) to accommodate each incoming and outgoing link thereof in communication with converter 310. Once an available exit pathway out of converter 310 has been selected for a particular packet, the wavelength for that optical signal is converted to one of the possible wavelengths exiting the converter 310 for re-grouping by respective multiplexor devices ("MUX" at 331B–338B, and 314) to merge wavelengths within the same group, into respective single high-speed optical signals for transmitting out along outgoing links 311B to 318B, as is conventionally done in WDM systems. Once again, packets bound for other layers of the network protocol stack pass out an external output into conventional output-port processor (OPP) 324 in communication therewith.

EXAMPLES

Figure 4:
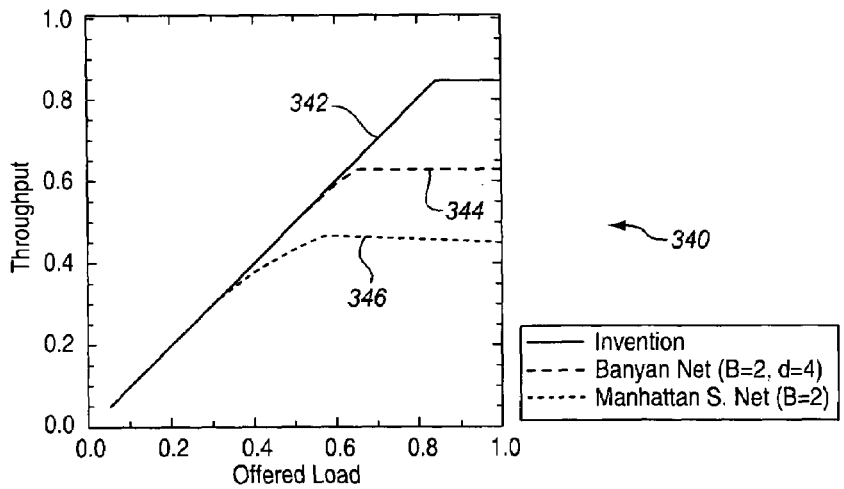
FIG. 4 is a graphical representation providing a comparison of operational values, namely throughput versus offered load, for three different networks (a preferred network of the invention, a banyan network, and a Manhattan Street network). The graph representing a preferred network of the invention was obtained by computer simulation thereof.
Figure 5:
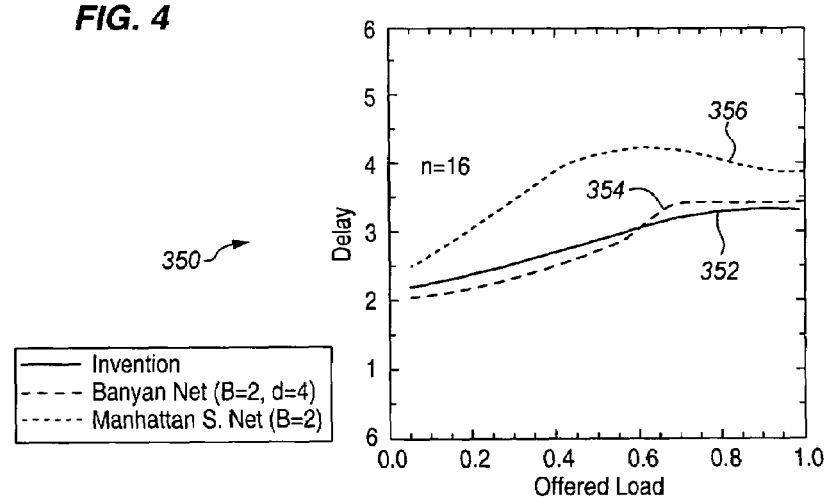
FIG. 5 is a graphical representation providing a comparison of operational values, namely delay versus offered load, for the same three different networks. Once a gain, values observed and plotted for a preferred network of the invention were obtained by computer simulation thereof.
Figure 6:
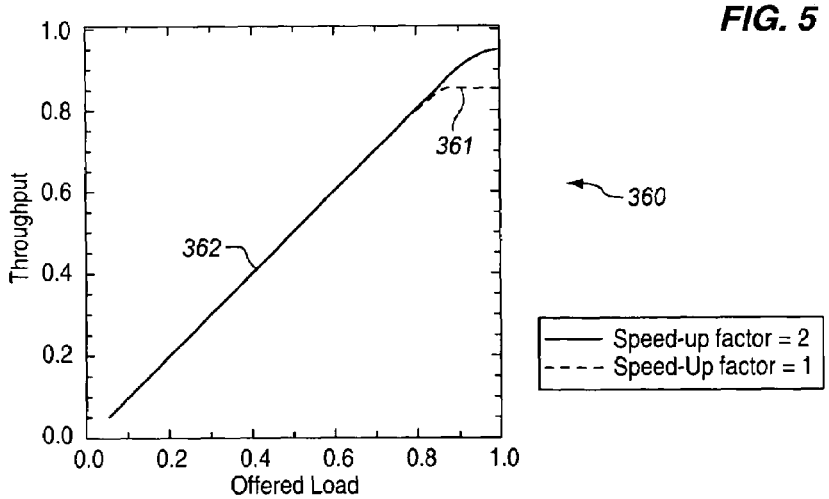
FIG. 6 is a graphical representation of the effectiveness of a speed advantage on performance of a preferred network of the invention. Once again, values plotted for a preferred network of the invention were obtained by computer simulation thereof.

FIGS. 4, 5, and 6 graphically represent performance comparison results obtained using a computer-simulation of a preferred spherical mesh network and method of the invention according to preferred embodiments discussed herein. For purposes of discussion, the computer-simulation will be referenced in connection with features depicted in other figures. Each external input route 215 of each switch element generates a new packet independently with a fixed probability of ρ. Packets are generated as fixed-length "cells" such as are encountered in conventional ATM network technology. In ATM, cells are packets fixed at 53 bytes in length. Packets arriving at the switch element 210 along any of the links (211A–218A) or input route (215) are assigned random destination addresses. The buffer is considered to have a total of b buffer slots. Upon the generation of a packet, the length of the input queue is incrementally increased. If this length exceeds the maximum number of input buffers, packet loss may occur (the generated packet is considered discarded in the simulation). Although the packet is present as generated, permission must be granted from a controller to accept the packet into a corresponding switch element. Contention for any exit pathway out of a switch element may arise for either the external link (214) out of the network, or any of the outgoing bi-directional links (211B–218B). Packets that 'win' a contention get directed along the exit pathway under contention. If a packet 'loses' a contention, it is deflected out along an available second-choice exit pathway to another switch element (it is not deflected out of the network along an external output route) and a priority designator for the deflected packet is incremented to reflect its having had to take a 'less-direct' route toward its final outbound destination. If a packet has reached its outbound destination, it is directed out the external output route of that destination switch element (unless that route is under contention, and it loses).

For reference in connection with FIGS. 4 and 6: The average number of packets leaving the network per packet cycle per external link is referred to as throughput (T). The average delay (D) is measured from the time a packet enters the network along an external route into a switch element until the time that packet leaves the network through an outbound destination external route. One can determine how much time a packet spends traveling throughout a network by time-stamping the packet upon its arrival—upon leaving the network, the time-stamped value is subtracted from the current time. One can compare the delay of any particular packet with the length of the most-direct path from its source to destination, to make an assessment of how efficiently the network is operating. One might also assess the network performance by determining an average number of deflections (Δ) per exiting packet. In FIGS. 4 and 5, one can better appreciate the comparison 340 and 350 of certain operational values for three different networks (a preferred network of the invention 342, 352, a banyan network 344, 354 with switch devices of size d=4 and buffers between each internal link of B=2 per port, and a Manhattan Street network 346, 356 with buffers between each internal link of B=2 per port). Plot 340 in FIG. 4 is for throughput versus offered load; plot 350 in FIG. 5 is for delay versus offered load. For purposes of comparison as computer-simulated, here, the network dimension was arbitrarily set for all three plots at n=16 switch devices. For the Manhattan Street network, throughput starts to flatten out 346 at offered loads exceeding ρ=0.4 since the network begins to reach its full capacity at this load. In fact, by increasing load, the Manhattan Street network falls slightly. In comparison, the banyan network flattens 344 out at ρ=0.6; whereas the network of the invention 342 outperforms either and reaches ρ=0.8 before beginning to flatten (as simulated). FIG. 5 illustrates, once again, that the network of the invention 352 generates the least delay when handling large offered loads when comparing with the delay of a banyan network 354 or Manhattan Street network 356.

FIG. 6 provides a visual for comparing the effectiveness of a speed advantage on performance of a preferred network of the invention. For reference in connection with this graph: Speed advantage (sometimes called speed-up factor) refers to the ratio of internal network operation speed (along bi-directional couplings) to the external link speed. The plot 362 generated as simulated (see above) has an s=2, thus, the internal bi-directional couplings operate at a rate that is twice that of the rate out along external routes. Where s=1, plot 361, these internal couplings operate at effectively the same rate as the external input/output routes. The network performs more efficiently at s=2 whereby it delivers the entire offered load to external routes regardless of traffic load.

Figure 7:
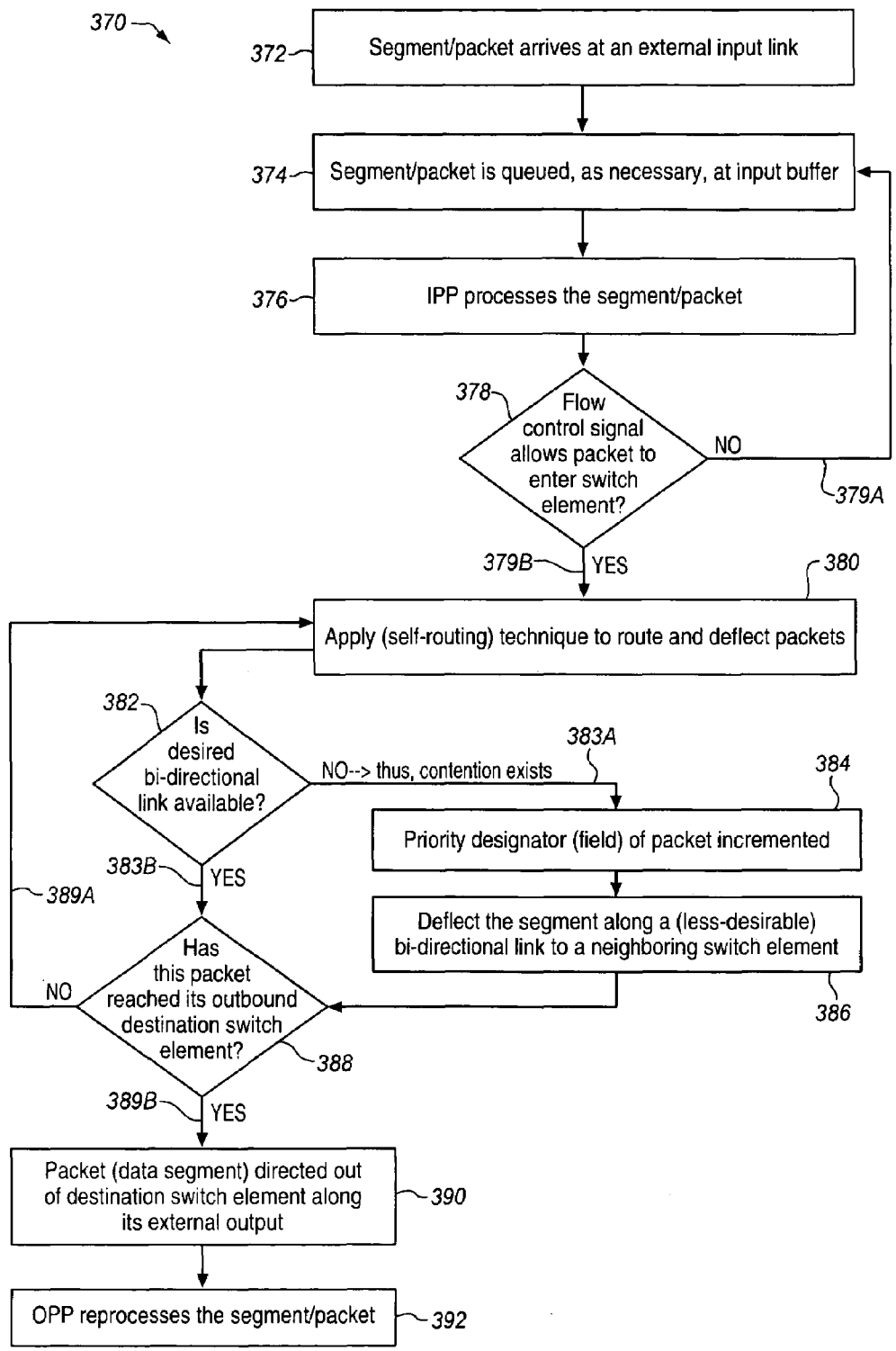
FIG. 7 depicts the features of a preferred method of the invention 370 including additional further distinguishing features, in a detailed flow-diagram format.

FIG. 7 provides details of preferred and alternative-preferred implementations of a novel network and method of the invention so they can be better appreciated: Specific novel additional features of the method (plus operation of the novel mesh network, for reference see those diagrammed in FIGS. 1 and 2 at 100 and 100') of the invention, as characterized herein, are readily ascertainable from this detailed flow diagram, as labeled and described.

The method depicted at 370 begins with the arrival (referenced by box 372) of a data segment/packet at an external input link (such as those labeled 215 in FIGS. 3A and 316 in FIG. 3B). Next, the segment/packet is queued, as necessary, at an input buffer (such as that labeled 216 in FIG. 3A). The appropriate IPP (225 in FIGS. 3A and 325 in FIG. 3B) processes the packet 376. Flow control feature of the controller gives the signal to permit the packet to enter the switch element 378. If not ready to receive a new packet from outside the network, 379A, the packet remains in the memory buffer until flow control gives such permission to move the packet by way of the IPP. If the segment/packet is permitted to enter the switch element, 379B, the technique of the invention for the routing and deflecting (if necessary) of packets is employed 380. Every data segment/packet preferably contains address information and priority designation information, which is historical information of where the packet has been and how often it has been deflected from a generally most-direct route to its outbound destination. First, an inquiry is made 382: Is the most-direct bi-directional coupling available or, if an outbound destination has been reached, is the external output route available? If not, 383A, a priority designator of the packet is incremented 384 and the segment/packet is directed out a less-direct bi-directional link to a neighboring switch element (thus, causing a deflection). Following arrow 383B: If the desired exit pathway link is available, and if not available then a contention for the desired link is won, the packet's destination address is interrogated 388 (a comparison is made to see if an updated source address of the packet equals the destination address thereof) to confirm whether the packet is at its outbound destination. This step 388 may take place prior to selecting an exit pathway, as the exit pathway may in fact be the external output route of the switch element if it is the outbound destination of the packet. Following arrow 389B: The packet is directed out of the destination switch along its external output route (box 390) for processing by the OPP (box 392).

By way further reference, the computer executable program code on a computer readable storage medium for routing a plurality of data segments through a network is operational in connection with conventional storage medium/media. Accordingly, a storage medium/media can be any data carrier or recording medium into/onto which information (such as data) can be read/copied and held, such as magnetic media (diskettes, hard disks, Iomega's ZIP®/JAZ®/Click!® disks, tapes, drums, core, thin-film, etc.), optic media (CD-ROM, CD-E, CD-R, CD-RW, DVD, and other devices whereby readout is with a light-source and photodetector), and magneto-optic media (media for which optical properties can be changed by an applied magnetic field-used in high end drives). As is well known, before data can be written to a storage medium it must be 'formatted' (organized and prepared to receive data). Data, as that term is used, includes any representation of characters and/or symbols or analog quantities/information to which any meaning may be assigned that can serve as input for transmitting and processing.

While certain representative embodiments and details have been shown merely for the purpose of illustrating the invention, those skilled in the art will readily appreciate that various modifications may be made without departing from the novel teachings or scope hereof. Accordingly, all such modifications are intended to be included within the scope of this invention as defined in the following claims. Although the commonly employed preamble phrase "comprising the steps of" may be used herein, or hereafter, in a method claim, the Applicant in no way intends to invoke 35 U.S.C. Section 112 ¶6. Furthermore, in any claim that is filed herewith or hereafter, any means-plus-function clauses used, or later found to be present, are intended to cover the structures described herein as performing the recited function and not only structural equivalents but also equivalent structures.

What is claimed is:

1. A network for routing a plurality of data segments therethrough, each of the data segments containing an address information, the network comprising:

a first, second, and third switch element each comprising a respective first, second and third external input for routing data segments into the network and a respective first, second and third external output for routing data segments out of the network;

a first bi-directional coupling between said first and second switch elements, a second bi-directional coupling between said first and third switch elements, and a third bi-directional coupling between said second and third switch elements;

a first controller for interrogating the address information of each of the data segments inbound into said first switch element, any of said inbound data segments received by said first switch element to be directed out along a selected exit pathway;

whereby said exit pathway for said any inbound data segment so received is selected according to the address information of said any inbound data segment, and if a contention exists for said exit pathway, further according to a priority designator of said any inbound data segment; said exit pathway to be selected from the group consisting of: if said first switch element is an outbound destination for said any inbound data segment, said first external output; and one of said bi-directional couplings in communication with said first switch element;

said external input is in direct communication with a first input-port processor; said external output is in direct communication with a first output-port processor; each said bi-directional coupling comprises an optical fiber link; and any of the data segments that arrive at said first input-port processor, do so as optical signals;

said first switch element comprises a photonic wavelength converter having at least one node to correspond with each of said external first input and said external first output, and at least two nodes to correspond with each of said bi-directional couplings in communication with said first switch element;

said node corresponding with said first external input is in direct communication with a respective optical wavelength demultiplexor; and said node corresponding with said first external output is in direct communication with a respective optical wavelength multiplexor.

2. A network for routing a plurality of data segments therethrough, each of the data segments containing an address information, the network comprising:

a first, second, and third switch element each comprising a respective external input for routing data segments into the network and a respective external output for routing data segments out of the network;

a first bi-directional coupling between said first and second switch elements, a second bi-directional coupling between said first and third switch elements, and a third bi-directional coupling between said second and third switch elements;

a first controller for interrogating the address information of each of the data segments inbound into said first switch element, any of said inbound data segments received by said first switch element to be directed out along a selected exit pathway;

whereby said exit pathway for said any inbound data segment so received is selected according to the address information of said any inbound data segment, and if a contention exists for said exit pathway, further according to a priority designator of said any inbound data segment; said exit pathway to be selected from the group consisting of:

if said first switch element is an outbound destination for said any inbound data segment, said first external output and one of said bi-directional couplings in communication with said first switch element; and wherein said external input is in direct communication with a first buffer and an input-port processor; said external output is in direct communication with a first output-port processor; said first switch element comprises a crossbar switch having at least one node to correspond with each of said external first input and said external first output, and at least two nodes to correspond with each of said bi-directional couplings in communication with said first switch element; and any of the data segments that arrive at said first buffered input-port processor, do so as electrical signals.

3. The network of claim 2 wherein:

any of the data segments entering said first buffer are held in a respective buffer slot thereof until permission to enter said first switch element is granted, on a first-in-first-out (FIFO) basis, by said first controller; and said first controller to further: select said exit pathway and instruct said first switch element to so direct said any inbound data segment so received out of said first switch element, and update said priority designator of said any inbound data segment received for which said selected exit pathway is not along a generally direct route toward said any inbound data segment's outbound destination.

4. The network of claim 3 further comprising:

a fourth, fifth, and sixth switch element each comprising a respective fourth, fifth, and sixth external input for routing data segments into the network and a respective fourth, fifth, and sixth external output for routing data segments out of the network; and a fourth bi-directional coupling between said first and fourth switch elements, a fifth bi-directional coupling between said second and fourth switch elements, and a sixth bi-directional coupling between said third and fourth switch elements, a seventh bi-directional coupling between said second and fifth switch elements, an eighth bi-directional coupling between said fourth and fifth switch elements; a ninth bi-directional coupling between said second and sixth switch elements; a tenth bi-directional coupling between said fifth and sixth switch elements; and an eleventh bi-directional coupling between said fourth and sixth switch elements.

5. A network for routing a plurality of data segments therethrough, each of the data segments containing an address information, the network comprising:

a first, second, and third switch element each comprising a respective external input for routing data segments into the network and a respective external output for routing data segments out of the network;

a first bi-directional coupling between said first and second switch elements, a second bi-directional coupling between said first and third switch elements, and a third bi-directional coupling between said second and third switch elements;

a first controller for interrogating, the address information of each of the data segments inbound into said first switch element, any of said inbound data segments received by said first switch element to be directed out along a selected exit pathway;

whereby said exit pathway for said any inbound data segment so received is selected according to the address information of said any inbound data segment, and if a contention exists for said exit pathway, further according to a priority designator of said any inbound data segment; said exit pathway to be selected from the group consisting of: if said first switch element is an outbound destination for said any inbound data segment, said first external output; and one of said bi-directional couplings in communication with said first switch element; and wherein: the address information comprises a destination address associated with said outbound destination; each said first, second, and third switch element has a respective first, second, and third location index associated therewith; said contention exists if said exit pathway initially selected for any two of said data segments received is, concurrently, the same; said external input is in direct communication with a first input-port processor; and said external output is in direct communication with a first output-port processor.

6. The network of claim 5 wherein:

each of the address information further comprises a source address; said source address of said any inbound data segment received by said first switch element is updated by said first controller according to said first location index, if said updated source address is an equivalent of said destination address of said any inbound data segment received, said first switch element is said outbound destination therefor; and said first controller to update said priority designator of said any inbound data segment so received for which said selected exit pathway is not along a generally direct route toward said any inbound data segment's outbound destination.

7. The network of claim 5 further comprising:

a second controller for interrogating the address information of each of the data segments inbound into said second switch element, any of said inbound data segments received by said second switch element to be directed out along a second selected exit pathway; and a third controller for interrogating the address information of each of the data segments inbound into said third switch element, any of said inbound data segments received by said third switch element to be directed out along a third selected exit pathway.

8. The network of claim 7 further comprising:

a fourth switch element having a respective location index associated therewith and comprising a fourth external input for routing data segments into the network and a fourth external output for routing data segments out of the network; and a fourth bi-directional coupling between said first and fourth switch elements, a fifth bi-directional coupling between said second and fourth switch elements, and a sixth bi-directional coupling between said third and fourth switch elements;

whereby said second exit pathway for said any inbound data segment received by said second switch element is selected according to the address information of said any inbound data segment, and if a contention exists for said second exit pathway, further according to a priority designator of said any inbound data segment; said second exit pathway to be selected from the group consisting of: if said second switch element is said outbound destination for said any inbound data segment, said second external output; and one of said bi-directional couplings in communication with said second switch element.

9. The network of claim 8 further comprising:

a fifth and sixth switch element, each having a respective location index associated therewith and each comprising a respective external input for routing data segments into the network and a respective external output for routing data segments out of the network; and a seventh bi-directional coupling between said second and fifth switch elements; an eighth bi-directional coupling between said fourth and fifth switch elements; a ninth bi-directional coupling between said second and sixth switch elements; a tenth bi-directional coupling between said fifth and sixth switch elements; and an eleventh bi-directional coupling between said fourth and sixth switch elements.

10. The network of claim 9 wherein each of said bi-directional couplings extends along a generally shortest available path between said switch elements coupled thereby, and further comprising:

a fourth controller for interrogating the address information of each of the data segments inbound into said fourth switch element, any of said inbound data segments received by said fourth switch element to be directed out along a fourth selected exit pathway; and a fifth controller for interrogating the address information of each of the data segments inbound into said fifth switch element, any of said inbound data segments received by said fifth switch element to be directed out along a fifth selected exit pathway.

11. The network of claim 10 wherein said fourth exit pathway for said any inbound data segment received by said fourth switch element is selected according to the address information of said any inbound data segment received by said fourth switch element, and if a contention exists for said fourth exit pathway, further according to a priority designator of said any inbound data segment received; said fourth exit pathway to be selected from the group consisting of: if said fourth switch element is said outbound destination for said any inbound data segment received by said fourth switch element, said fourth external output; and one of said bi-directional couplings in communication with said fourth switch element.

12. A method for routing a plurality of data segments through a network having first, second, and third switch elements, the method comprising the steps of:

providing a first bi-directional coupling between said first and second switch elements, a second bi-directional coupling between said first and third switch elements, and a third bi-directional coupling between said second and third switch elements;

interrogating an address information of each of the data segments inbound into any of said first, second, and third switch elements routed by way of a respective external input;

selecting an exit pathway for each of said inbound data segments received by a respective one of said switch elements according to said address information of said each data segment received, and if a contention exists for said exit pathway, further according to a priority designator of said each data segment received; said exit pathway to be selected from the group consisting of: if said respective switch element is an outbound destination for said each data segment received, a respective external output of said respective switch element; and one of said bi-directional couplings in communication with said respective switch element;

wherein said contention exists if said exit pathway initially selected for any two of said data segments received is, concurrently, the same; and updating said priority designator of any one of said each data segment received for which said selected exit, pathway is not along a generally direct route toward said each data segment's outbound destination; and directing said each data segment received out along said selected exit pathway.

13. A method for routing a plurality of data segments through a network having first, second, and third switch elements, the method comprising the steps of:

providing a first bi-directional coupling between said first and second switch elements, a second bi-directional coupling between said first and third switch elements, and a third bi-directional coupling between said second and third switch elements;

interrogating an address information of each of the data segments inbound into any of said first, second, and third switch elements routed by way of a respective external input;

selecting an exit pathway for each of said inbound data segments received by a respective one of said switch elements according to said address information of said each data segment received, and if a contention exists for said exit pathway, further according to a priority designator of said each data segment received; said exit pathway to be selected from the group consisting of: if said respective switch element is an outbound destination for said each data segment received, a respective external output of said respective switch element; and one of said bi-directional couplings in communication with said respective switch element; and updating a source address of said each inbound data segment received by said respective switch element according to a respective location index thereof; if said updated source address is an equivalent of said destination address of said each data segment received, said respective switch element is said outbound destination therefor, and if said updated source address is not yet said equivalent, said exit pathway is selected from any one of said bi-directional couplings along a generally direct route toward said outbound destination of said each data segment received.

14. A method for routing a plurality of data segments through a network having first, second, and third switch elements, the method comprising the steps of:

providing a first bi-directional coupling between said first and second switch elements, a second bi-directional coupling between said first and third switch elements, and a third bi-directional coupling between said second and third switch elements;

interrogating an address information of each of the data segments inbound into any of said first, second, and third switch elements routed by way of a respective external input;

selecting an exit pathway for each of said inbound data segments received by a respective one of said switch elements according to said address information of said each data segment received, and if a contention exists for said exit pathway, further according to a priority designator of said each data segment received; said exit pathway to be selected from the group consisting of: if said respective switch element is an outbound destination for said each data segment received, a respective external output of said respective switch element and one of said bi-directional couplings in communication with said respective switch element; and wherein the data segments enter, as optical signals, into any one of said first, second, and third switch elements through a respective first, second, and third optical wavelength demultiplexor in communication with a respective first, second, and third input-port processor; and further comprising the steps of demultiplexing an incoming said optical signal at a first wavelength using one of said respective demultiplexors, and converting said wavelength of said incoming optical signal prior to directing the data segments thereof out along said selected exit pathway for multiplexing.

15. A method for routing a plurality of data segments through a network having first, second, and third switch elements, the method comprising the steps of:

providing a first bi-directional coupling between said first and second switch elements, a second bi-directional coupling between said first and third switch elements, and a third bi-directional coupling between said second and third switch elements;

interrogating an address information of each of the data segments inbound into any of said first, second, and third switch elements routed by way of a respective external input;

selecting an exit pathway for each of said inbound data segments received by a respective one of said switch elements according to said address information of said each data segment received, and if a contention exists for said exit pathway, further according to a priority designator of said each data segment received; said exit pathway to be selected from the group consisting of: if said respective switch element is an outbound destination for said each data segment received, a respective external output of said respective switch element; and one of said bi-directional couplings in communication with said respective switch element; and wherein the data segments enter, as electrical signals, into any one of said first, second, and third switch elements through a respective first, second, or third buffer in communication with a respective first, second, and third input-port processor; and further comprising the step of holding the data segments in a respective one of a plurality of buffer slots of each of said buffers, until permission to enter said any first, second, or third switch element is granted, on a first-in-first-out (FIFO) basis.

16. The method of claim 15 further comprising the steps of:

interrogating an address information of each of the data segments inbound into any of a fourth, fifth, and sixth switch elements;

providing a respective bi-directional coupling between said first and fourth switch elements, between said second and fourth switch elements, between said third and fourth switch elements, between said second and fifth switch elements, between said fourth and fifth switch elements, between said second and sixth switch elements, between said fifth and sixth switch elements, and between said fourth and sixth switch elements; and updating said priority designator of each one of said inbound data segments received by any of said first, second, third, fourth, fifth and sixth switch element for which said selected exit pathway is not along a generally direct route toward said each data segment's outbound destination; whereby if any of said first, second, third, fourth, fifth and sixth switch element is not said outbound destination for said each inbound data segment received, then said exit pathway therefor is selected from any one of said bi-directional couplings.

17. A computer executable program code on a computer readable storage medium for routing a plurality of data segments through a network having first, second, and third switch elements, the program code comprising:

a first program sub-code for interrogating an address information of each of the data segments inbound into any of said first, second, and third switch elements; whereby a bi-directional coupling is provided between said first and second switch elements, between said first and third switch elements, and between said second and third switch elements;

a second program sub-code for selecting an exit pathway for each of said inbound data segments received by a respective one of said switch elements according to said address information of said each data segment received, and if a contention exists for said exit pathway, further according to a priority designator of said each data segment received; said exit pathway to be selected from the group consisting of: if said respective switch element is an outbound destination for said each data segment received, a respective external output of said respective switch element; and one of said bi-directional couplings in communication with said respective switch element;

said first program sub-code comprises instructions for reading said each inbound data segment into a respective one of a first, second, or third buffer in communication with a respective one of said first, second, and third switch elements, until permission to enter said respective switch element is granted, on a first-in-first-out (FIFO) basis; and said second program sub-code comprises instructions for: determining whether said exit pathway initially selected for any two of said data segments received is, concurrently, the same; and if so, then reading and comparing said priority designator of each of said any two data segments received; and updating said priority designator of a one of said two data segments received for which said selected exit pathway is not along a generally direct route toward said one data segment's outbound destination.

18. A computer executable program code on a computer readable storage medium for routing a plurality of data segments through a network having first, second, and third switch elements, the program code comprising:

a first program sub-code for interrogating an address information of each of the data segments inbound into any of said first, second, and third switch elements; whereby a bi-directional coupling is provided between said first and second switch elements, between said first and third switch elements, and between said second and third switch elements;

a second program sub-code for selecting an exit pathway for each of said inbound data segments received by a respective one of said switch elements according to said address information of said each data segment received, and if a contention exists for said exit pathway; further according to a priority designator of said each data segment received; said exit pathway to be selected from the group consisting of: if said respective switch element is an outbound destination for said each data segment received, a respective external output of said respective switch element; and one of said bi-directional couplings in communication with said respective switch element;

said first program sub-code further comprises instructions for updating a source address of said each inbound data segment received by said respective switch element according to a respective location index thereof; and said second program sub-code further comprises instructions for: if said updated source address is an equivalent of said destination address of said each data segment received, said respective switch element is said outbound destination therefore; if said updated source address is not yet said equivalent, said exit pathway is selected from any one of said bi-directional couplings along a generally direct route toward said outbound destination of said each data segment received; and directing said each data segment received out along said selected exit pathway.

\* \* \* \* \*